United States Patent
Kipping et al.

(10) Patent No.: US 9,901,964 B2
(45) Date of Patent: Feb. 27, 2018

(54) DEVICE FOR COOLING ROLLS (71) Applicant: SMS Siemag Aktiengesellschaft, Düsseldorf (DE)

(72) Inventors: Matthias Kipping, Herdorf (DE); Johannes Alken, Siegen (DE); Ralf Seidel, Dillenburg (DE); Torsten Müller, Kreuztal (DE)

(73) Assignee: SMS GROUP GMBH, Dësseldorf (DE)

( * ) Notice: Subject to any disclaimer, the term of this patent is extended or adjusted under 35 U.S.C. 154(b) by 725 days.

(21) Appl. No.: 14/400,491

(22) PCT Filed: May 8, 2013

(86) PCT No.: PCT/EP2013/059561
§ 371 (c)(1),
(2) Date: Nov. 11, 2014

(87) PCT Pub. No.: WO2013/167642
PCT Pub. Date: Nov. 14, 2013

(65) Prior Publication Data
US 2015/0135792 A1 May 21, 2015

(30) Foreign Application Priority Data

May 11, 2012 (DE) .................. 10 2012 207 957
Sep. 17, 2012 (DE) .................. 10 2012 216 570

(51) Int. Cl.
B21B 27/10 (2006.01)
B21B 37/74 (2006.01)
B23P 19/00 (2006.01)

(52) U.S. Cl.
CPC .............. *B21B 27/10* (2013.01); *B21B 37/74* (2013.01); *B23P 19/00* (2013.01);
(Continued)

(58) Field of Classification Search
CPC ... B21B 27/10; B21B 27/06; B21B 2027/103; B21B 2267/17; B21B 37/32;
(Continued)

(56) References Cited

U.S. PATENT DOCUMENTS 3,357,224 A    12/1967   Muller
4,671,091 A *   6/1987   Atack .................... B21B 27/10
                                                      72/201

(Continued)

FOREIGN PATENT DOCUMENTS

DE         3425129 A1     1/1986
DE         3616070 A1    12/1986
(Continued)

*Primary Examiner* — Teresa M Ekiert
(74) *Attorney, Agent, or Firm* — Lucas & Mercanti, LLP; Klaus P. Stoffel (57) ABSTRACT

A device for cooling a roll for rolling materials, including a cooling shell opposite a sub-region of the roll surface circumference, for forming a cooling gap, through which a cooling fluid can flow, between the sub-region and the cooling shell. The device further includes a first lever which can be pivoted about a suspension point, which can be pivoted toward the roll surface, and which is rotatably connected to a first end region of the cooling shell, when viewed in the circumferential direction of the roll, and a second lever which can be pivoted about another suspension point, which can be pivoted toward the roll surface, and which is rotatably connected to the second end region of the cooling shell, when viewed in the circumferential direction of the roll, such that the cooling gap can be selectively reduced or increased by pivoting the levers.

25 Claims, 4 Drawing Sheets

(52) U.S. Cl.
CPC ..... *B21B 2027/103* (2013.01); *B21B 2267/12* (2013.01); *Y10T 29/49826* (2015.01)

(58) Field of Classification Search
CPC ..... B21B 37/74; B21B 45/02; B21B 45/0203; B21B 45/0209; B21B 45/0218; B21B 45/0233
See application file for complete search history.

(56) References Cited

U.S. PATENT DOCUMENTS

| | | | |
|---|---|---|---|
| 4,741,193 | A | 5/1988 | Kimura et al. |
| 5,212,975 | A | 5/1993 | Ginzburg |
| 5,553,469 | A * | 9/1996 | Seidel ................. B21B 27/10 72/13.4 |
| 8,281,632 | B2 | 10/2012 | Uijtdebroeks et al. |
| 2012/0031159 | A1 | 2/2012 | Seidel et al. |

FOREIGN PATENT DOCUMENTS

| | | |
|---|---|---|
| JP | 63303609 A | 12/1988 |
| JP | 07284820 A | 10/1995 |
| RU | 2193936 C1 | 12/2002 |
| SU | 1069892 A1 | 1/1984 |
| UA | 35811 U | 10/2008 |
| WO | 2008104037 A1 | 9/2008 |
| WO | 2010099925 A1 | 9/2010 |

\* cited by examiner

DEVICE FOR COOLING ROLLS

The present application is a 371 of International application PCT/EP2013/059561, filed May 8, 2013, which claims priority of DE 10 2012 207 957.2, filed May 11, 2012, and DE 10 2012 216 570.3, filed Sep. 17, 2012, the priority of these applications is hereby claimed and these applications are incorporated herein by reference.

BACKGROUND OF THE INVENTION

The present invention relates to a device for cooling rolls, in particular worker rolls.

U.S. Pat. No. 5,212,975 discloses a device for cooling a roll in a rolling mill, which comprises at least one spray bar having a plurality of spray nozzles. This spray bar may be moved in a translatory, rotating or pivoting manner, in order to adjust the angle of the bar in relation to the roll surface or the spacing of said spray bar from the roll. It is disadvantageous in devices of this type that efficiency is in need of improvement. In particular, comparatively large amounts of coolant are required for adequate cooling.

WO 2010/099925 A1 discloses a method and a cooling device for cooling the rolls of a roll stand. The rolls here are cooled with a cooling liquid on at least two part-regions along their circumference and are cooled by at least two cooling-shell segments which are opposite one another on the roll surface and are interconnected in an articulated manner. The complex construction of the multi-part cooling shell, for example, is disadvantageous in this arrangement. A further disadvantage may lie in a constricted diversion of the flow of coolant from the cooling gap, according to this device, which may result in turbulent flows or undesirable cross flows in the cooling gap.

According to JP 63303609, a method and a device for cooling a roll, in which a thin plate is provided opposite the roll surface of a worker roll, are disclosed. The gap formed between the roll surface and the plate is manually adjustable by way of adjustment screws. The upper and the lower end of the shell are provided with water supply boxes and water drainage boxes. Furthermore, the device is sealed toward the top and the bottom on the roll surface by the provision of a compression screw. It is disadvantageous in this device that its adjustment has to be performed manually, for example. This is particularly valid against the background of a plurality of daily roll changes in a rolling mill. If, as usual, a rolling mill disposes of seven roll stands having in each case two worker rolls, for example, in many cases the latter are exchanged four times per day. In this case, manual adjustment has to be performed 56 times per day. Furthermore, according to the prior art, the plates or cooling shells are coupled to or mounted on the roll stand, respectively. Every time the rolls are exchanged, this requires dismounting of the cooling device and/or the provision of 56 specially adapted installation parts, for example. The costs created thereby are significant.

SUMMARY OF THE INVENTION

It is an object of the invention to provide an improved cooling device for a roll, in particular for a worker roll for rolling metal.

A further object may lie in making possible an automatic adjustability of the device or of the spacing between the device and the roll surface to be cooled, respectively, in particular after an exchange of rolls.

The invention discloses a device for cooling a roll, in particular a worker roll for rolling stock to be rolled. The device comprises a (rigid) cooling shell which lies opposite at least a part-region of the circumference of the roll surface, for forming a cooling gap through which a cooling fluid can flow between the part-region of the roll surface and the cooling shell. Said device furthermore comprises a first lever which is pivotable about a suspension point and which is pivotable in the direction of the roll surface and, when viewed in the circumferential direction of the roll, is rotatably connected to a first end region of the cooling shell, and a second lever which is pivotable about a further suspension point and which is pivotable in the direction of the roll surface and, when viewed in the circumferential direction of the roll, is connected to the second end region of the cooling shell so as to be displaceable, wherein the cooling gap at the first end region of the cooling shell decreases when the first lever is pivoted in the direction of the roll surface, and the cooling gap at the second end region of the cooling shell is decreased when the second lever is pivoted in the direction of the roll surface. When the lever is pivoted away from the roll surface, the gap is correspondingly increased. In other words, the cooling gap is selectively decreasable or increasable by pivoting the levers about their suspension points. A gap height which is identical when viewed in the circumferential direction of the roll is not mandatory here.

On account of this comparatively simple mechanical arrangement the cooling shell can be placed in a defined manner or the spacing between the shell and the gap can be adapted, respectively, by pivoting movements of the levers. In this manner, a simplified or improved cooling device, respectively for cooling a surface region of a roll is provided by the construction according to the invention.

According to a preferred embodiment of the device, the second end region of the cooling shell is connected to the second lever in a sliding or rolling manner. On account of such a relative sliding or rolling movement, the cooling shell at its second end region can be guided in a defined manner or by the second lever, respectively. A sliding connection may be made possible for example by way of a combination of a spring element and a slide rail, in conjunction with a slide block which slides on the slide rail. It can be ensured, on account of the spring element, that the slide rail and the slide block cannot be lifted apart. Alternatively, a roller may be provided on the lever or the cooling shell. On account of the roller, a rolling relative movement between the lever and the cooling shell would be possible. The roller could be guided in a guide which avoids that the roller is lifted off. Alternatively, the roller could likewise be kept in contact with the surface on which it rolls by way of an elastic element or a spring element, respectively. It is irrelevant here on which of the two elements (the cooling shell and the second lever) the roller is disposed, or on which of the two elements the slide block or the slide rail are in each case located, respectively. In general, the slide block could be guided in a guide on the slide rail, which prevents the block being lifted off the rail. Alternatively, the slide block itself could be configured as a guide for preventing the slide block being lifted off the slide rail.

According to a preferred embodiment of the device, the second end region of the cooling shell is connected to the second lever in such a manner that the former is moved on a defined, preferably linear, path when the second lever is moved. On account of this arrangement, in particular the calculability of the movement path of the cooling shell, in particular of its second end region, can be improved.

According to a further preferred embodiment of the device, the suspension points of the levers are disposed opposite the side of the cooling shell which faces away from the roll surface. An arrangement of this type allows a particularly compact constructive design of the device, for example.

According to a further preferred embodiment of the device, the pivot axis of the levers extending in each case through the suspension points extends so as to be substantially parallel to the roll axis. Moreover, the two suspension points preferably coincide, or the two suspension points are in one point, respectively. This feature, in turn, also simplifies the construction of the device and facilitates the calculability of the movements or the positions, respectively, of the element of the cooling device.

According to a further preferred embodiment of the device, said device furthermore comprises a nozzle for introducing a cooling fluid into the gap, which nozzle is configured on one of the end regions of the cooling shell for introducing the cooling medium in a substantially tangential manner, preferably for introducing a cooling fluid counter to the direction of rotation of the roll, into the gap. On account of an arrangement of this type, the cooling effect of the device can be furthermore improved, wherein in particular a high relative speed between the roll surface and the cooling fluid increases heat transfer. A substantially tangential introduction of the cooling fluid into the gap may furthermore help to reduce the barrier-layer thickness of the flow of the cooling liquid in the gap and thus, in turn, improve the cooling effect.

According to a further preferred embodiment of the device, said device comprises a first drive unit for pivoting the first lever about the first suspension point, and a second drive unit for pivoting the second lever about the further suspension point. Such drive units may comprise electric motors, pneumatic drive units or hydraulic drive units, for example.

According to a further preferred embodiment of the device, the first lever displays a first end region and a second end region (which lies opposite the first end region), wherein, when viewed in the circumferential direction of the roll, the first end region of said first lever is rotatably connected to the first end region of the cooling shell, and the second end region of said first lever is pivotably mountable or attachable, respectively, on the first suspension point. Furthermore, the second lever preferably comprises a first end region and a second end region (which lies opposite the first end region), wherein, when viewed in the circumferential direction of the roll, the first end region of said second lever is displaceably connected (for example in a rolling or sliding manner) to the further end region of the cooling shell and the second end region of said second lever is pivotably mountable or attachable, respectively, on the further suspension point.

According to a further preferred embodiment of the device, for pivoting the levers, the first and the second drive units are in each case connected to the first end regions of the levers. This feature makes possible a particularly good power transmission from the drive unit to the levers and thus increases the efficiency of the device.

According to a further preferred embodiment of the device, the first lever, on its first end region, comprises an end for contacting the roll surface, and the second lever, on its first end region, comprises an end for contacting the roll surface. The ends here may comprise in each case one rotatable roller or blocks or slide rails, respectively, for contacting the roll surface. On account of this feature, the levers can establish contact with the roll surface and, for example, make possible a determination of the position and/or of the diameter of the roll. The roller axes of this roller here preferably lie so as to be substantially parallel to the roller axis of the roll.

This is particularly relevant against the background of the rolls displaying a stock removal region. Normally, on account of the change in roll diameter normally caused by the exchange, the height of the cooling gap has to be manually adjusted again after a roll exchange. In other words, the spacing of the cooling shell from the roll surface has to be newly adjusted. This is time-consuming and costly, particularly in the case of a multiplicity of roll exchanges. Moreover, it has been found that sensors for measuring the spacing (in particular optical sensors) are often fault-prone and are thus not well suited to the rough conditions in rolling mills.

According to a further preferred embodiment of the device, said device is configured in such a manner that, when viewed in the circumferential direction of the roll, the end of the first lever contacts the roll surface ahead of the first end region, or there beside, respectively, of the cooling shell, and, when viewed in the circumferential direction of the roll, the end of the second lever contacts the roll surface behind the second end region, or there beside, respectively, of the cooling shell. An arrangement of this type has the advantage that the levers do not obstruct the cooling gap per se or engage therein, respectively. In principle, however, it is likewise possible for the levers to extend through slots in the cooling shell and through the gap to the roll surface and to thereby be selectively liftable off the roll surface by pivoting.

According to a further preferred embodiment of the device, when the ends of the levers are in contact with the roll surface, the levers and the part-region of the roll surface lying between the ends of the levers substantially define a triangle in a plane which is perpendicular to the roll axis, wherein the roll surface forms a curved side of the triangle, and the two levers form the remaining sides of the triangle, adjacent thereto. This arrangement represents only one possible arrangement of the levers. In general, the levers, when pivoted toward the roll surface, are preferably configured for making contact with two different points on the roll surface, when viewed in the circumferential direction of the roll.

According to a further preferred embodiment of the device, the first end of the first lever is connected to the first end region of the cooling shell by way of a center of rotation (rotating joint). Furthermore, the device preferably comprises a first arm which is rigidly connected to the first lever and a second arm which is rigidly connected to first end region of the cooling shell; wherein the center of rotation is connected to the first lever by way of the first arm, and the cooling shell is connected to the center of rotation by way of the second arm. Furthermore, the center of rotation is preferably movable in a plane which is perpendicular to the axial direction of the roll. By way of selection of corresponding arm lengths, the device can be used in a versatile manner.

In particular, it is possible for the arms to be configured so as to be readjustable for length. The levers may also be configured so as to be readjustable for length. Furthermore, the arms may be releasably connected to the levers or the cooling shell, such that, when viewed in the circumferential direction, cooling shells of different lengths or cooling shells which have been curved or shaped in various manners, respectively, can be employed. For the exchange of the cooling shell, the displaceable connection between the second lever and the second end of the cooling shell may also be releasable.

According to a further preferred embodiment of the device, the levers are in each case disposed so as to be pivotable about their respective suspension point in such a manner that, by pivoting the end which lies at their first end region, they are in each case capable of being brought into contact with the roll surface, or of being placed there against, respectively, and of being lifted thereof or pivoted away therefrom, respectively.

According to a further preferred embodiment of the device, the drive units in each case comprise at least one piston-cylinder unit which, for pivoting the lever, preferably at one of its/their ends, is/are (rigidly) connected to the first end region of the respective lever, and at its/their second end is/are rotatably mounted. The piston-cylinder units are furthermore, optionally, in each case connected to the first end region of the respective lever by way of a rigid arm. On account of the provision of corresponding arms, the device can easily be integrated in existing systems. In this manner, suspension points which are already present may be used. Furthermore, piston-cylinder units which are potentially already present may be used.

According to a further preferred embodiment of the device, the second end region of the cooling shell is connected to the first end region of the second lever by way of at least one elastic element or a guide rail. On account of such an elastic element or a guide rail, a defined contact between the cooling shell and the second lever can be ensured.

According to a further preferred embodiment of the device, the device furthermore comprises an evaluation system for determining the position of the roll and/or for adjusting the height of the cooling gap, which upon contact between the ends of the two levers and the roll surface, and based on the known geometry and/or arrangement of the levers, the cooling shell, the rotatable connection between the first lever (if applicable), and the positioning of the suspension points, and the diameter of the roll, is configured for calculating the height of the cooling gap. Whether and when, respectively, the levers are in contact with the roll surface may be determined by means of a pressure transducer of a piston-cylinder unit, for example. In the case of an electric drive, this may be determined by measuring the drive current, for example. Furthermore, a goniometer may be installed on the suspension points, in order to determine the angular position or the pivot angle, respectively, of the levers. Additionally or alternatively, a displacement sensor may be provided on the drive units, such that by means of the known geometry of the levers and the cooling shell, a deduction pertaining to the roll position and likewise to the spacing between the cooling shell and the roll surface could be made. The ends of the levers are preferably lifted off from the roll surface for the rolling operation. In this manner, wear and tear on the device is excluded.

According to a further preferred embodiment of the device, the levers, when viewed in a plane which is perpendicular to the axial direction of the roll, extend in each case in a rod-shaped manner toward the end at the first end region. However, rod-shaped is not to be understood as being limiting in such a manner that only rectilinear profiles are possible; rather, the levers may also display doglegs or bends, but should, however, preferably be rigid or defined in terms of their geometry, respectively. Also, a plurality of levers which are parallel to the axial direction of the roll may be provided, such that a plurality of first levers and/or second levers are disposed in one such direction.

However, the levers may likewise substantially extend in a plate-shaped manner, preferably in a plane which is parallel to the axial direction of the rolls. Again, this need not be a planar or rectilinear shape, respectively, doglegs or bends in the plate are also possible as long as the geometry of the plate is defined or known, respectively.

Likewise, the cooling shell, along the circumferential direction of the roll, is preferably configured so as to be rigid and/or free of articulation, and extends parallel to the axial direction of the roll, at least across part of the roll or the width of roll, respectively. In the event that a cooling medium is introduced into the gap between the cooling shell and the roll surface by means of a nozzle, the latter may comprise a row of a plurality of nozzles which are parallel to the axial direction of the roll or which are configured so as to be slotted in said direction.

According to a further preferred embodiment of the device, the device comprises a wiper for wiping off cooling fluid exiting from the cooling gap on an end of the cooling shell, wherein the wiper preferably extends in a plate-shaped manner away from the surface of the roll, so as to divert a flow of coolant exiting from the cooling gap away from the roll. In particular in comparison to a closed drip box, such a wiper has the advantage that the flow of coolant exiting from the cooling gap is not substantially obstructed but simply deflected. In particular, no cross flows are caused in the cooling gap on account of the retention in a closed box, which significantly counteract a uniform cooling effect of the coolant on the roll surface.

In general, the end regions of the levers or the cooling shell may also be described as halves of the levers or the cooling shells. The cooling shell per se is preferably only composed of one part which is rigid or inelastic/non-foldable, respectively, or bendable. Likewise, the levers are preferably configured so as to be substantially rigid. The levers may be mounted on a common suspension point, for example, or on different suspension points. These points may be located on elements which are already located in a rolling plant or a rolling mill, respectively, and thus are not necessarily part of the disclosed cooling device.

Furthermore, the invention is directed toward a cooling installation which comprises a device according to one of the preceding embodiments, wherein the installation comprises a support frame which is maneuverable in a substantially horizontal manner and independently of the position of the roll and by way of which the drive units and/or the levers are supported on the suspension points. This means that the cooling shell is mountable and/or maneuverable, independently of the roll support or the roll fitting parts. This significantly facilitates the exchange of the roll and avoids a laborious mounting and dismounting of the cooling device in the event of an exchange of rolls. The drive units and/or the levers are optionally mounted in a rotatable manner on the support frame.

In general, the suspension points are locationally fixed in relation to one another.

According to a preferred embodiment of the cooling installation, said cooling installation furthermore comprises a worker roll, wherein the cooling shell is capable of being placed against the roll surface by maneuvering the support frame and/or the drive units.

The device may also be directed toward a method for using the described device. The method here may relate to a method for determining the roll position and/or for adjusting the spacing between the cooling shell and the roll surface, and may comprise one or more of the following steps: providing a worker roll; determining the diameter of the worker roll; fitting the worker roll in a roll stand; bringing the cooling device close to the roll surface, preferably by means of the maneuverable support frame; contacting the roll surface by way of the levers, in particular by way of their ends, by pivoting the levers in the direction of the roll surface; calculating the position of the worker roll, in particular based on the known geometry and/or arrangement of the levers, the cooling shell, the rotatable connection between the first lever (if applicable), and the positioning of the suspension points, and the diameter of the roll; lifting the levers, by pivoting the levers away from the roll surface; adjusting the spacing of the cooling shell from the roll surface, by pivoting the levers; introducing cooling liquid into the cooling gap; commencing a rolling operation by the worker roll; stopping the rolling operation; increasing the cooling gap, by pivoting the levers and/or by maneuvering the device by means of the support frame; and dismounting the worker roll from the roll stand. The steps here, at least in part, may likewise be carried out in another sequence.

All features of the embodiments described above may be combined with one another or be substituted for one another.

BRIEF DESCRIPTION OF THE DRAWING

The figures of the exemplary embodiments are briefly described in the following. Further details may be obtained from the detailed description of the exemplary embodiments. In the drawings.

DETAILED DESCRIPTION OF THE INVENTION

Figure 1:
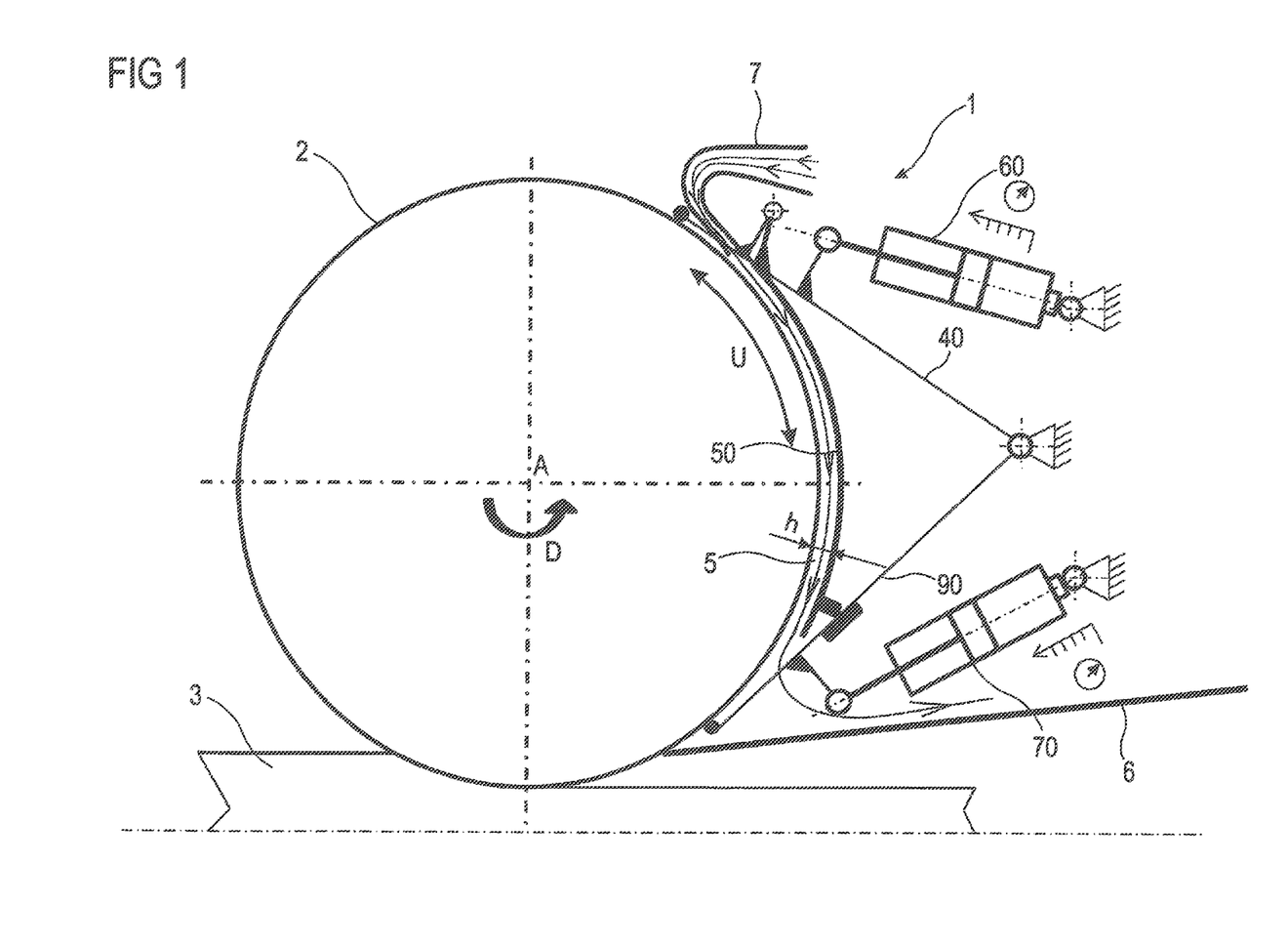
FIG. 1 shows a schematic cross section through an exemplary embodiment according to the invention of a cooling device which is placed against a roll.

FIG. 1 discloses an exemplary embodiment according to the invention of a cooling device 1. This cooling device 1 comprises a cooling shell 50 which extends in the circumferential direction U of the roll 2 across at least a part-region of the roll surface. The longitudinal axis or the rotation axis, respectively, of the roll 2 here preferably extends in the axial direction A and is rotatable about the roll axis, in particular in the direction of rotation D. As illustrated in FIG. 1, the cooling device 1 is preferably located on the delivery side of the roll 2 for rolling a metal strip 3; however, said cooling device 1 may likewise be located on the opposite infeed side. The roll 2 here preferably represents a worker roll 2 in a roll stand of a rolling mill (not depicted). Via a nozzle, 7, a cooling fluid, preferably a liquid such as water, for example, may be introduced into the cooling gap 5 formed between the cooling shell 50 and the roll surface. This nozzle 7 may preferably be disposed at an upper end of the cooling shell 50, as illustrated, such that coolant introduced into the cooling gap 5 via the nozzle 7 is discharged from the cooling gap 5 at the lower end. The fluid flow here preferably is discharged from the cooling gap 5 in a barrier-free manner. In particular, said fluid flow is not constricted by a water box which could cause turbulences or cross flows which could even extend back into the gap 5. It is only optionally provided, as illustrated, that a wiper 6 is in contact with the roll circumference or the roll surface, respectively, downstream of the gap 5, in order to divert water away from the roll surface and from the metal strip 3. Such a wiper 6 may preferably be formed by a metal plate, plastic plate or wooden plate.

Placing the cooling shell 50 against the roll surface may take place by means of disposing two levers 40, 90 and two drive units 60, 70, the arrangement and function of which will be described in more detail with reference to FIG. 2. On account of the cooling device 1, readjustability of the gap height h of the cooling gap 5 between the surface or the circumference, respectively, of the roll 2 and the cooling shell 50 is enabled. In other words, the spacing h between the cooling shell 50 and the roll 2 is readjustable or adjustable, respectively.

For the sake of clarity, reference has not been made to all details in the description of FIG. 1. FIG. 2 shows the cooling device 1 according to FIG. 1 in a more detailed manner; however, for improved clarity, the nozzle 7 is not illustrated in FIG. 2. At its upper end or its end region 51, respectively, the cooling shell 50 is connected to a first end region 41 of a lever 40. At a second end 49, the lever 40 is furthermore pivotably mounted on a bearing 8. The pivoting direction here may lie in a plane which is perpendicular to the roll axis A. The lever 40, on its first end region 41, is preferably rotatably connected to the upper end 51 of the cooling shell. A second lever 90, at one of its ends 99, is likewise pivotably mounted in a pivotable manner on a suspension point 8, wherein a first end region 91 of the second lever 90 is displaceably connected to a lower end region 59 of the cooling shell 50. As illustrated, such displaceability may be made possible by way of a slide block 95 and a corresponding slide rail 94, to which reference will be made in more detail at a later stage.

The suspension points 8 of both levers 40, 90, or the bearing points or pivoting points 8 of both levers 40, 90, respectively, here may also lie in one common point 8. This point 8 may lie opposite the side of the cooling shell 50 which faces away from the surface of the roll 2, for example. The first lever 40 and the second lever 90 are drivable or pivotable, respectively, in each case by way of drive units 60, 70. To this end, the drive units 60, 70 preferably engage on the respective end region 41, 91 of the levers 40, 90. As illustrated in FIG. 2, it is possible for the drive units 60, 70 to be formed by piston-cylinder units 60, 70. Such piston-cylinder units 60, 70, with one of their ends 69, 79, may be pivotably mounted on suspension points 68, 78. The pivoting direction may again lie in a plane which is perpendicular to the axial direction A of the roll 2. The present invention, however, is not limited to piston-cylinder units as drive units 60, 70; rather, other types of drives, such as pneumatic drives or electric or electro-mechanical drives, respectively, may be used. In general, the drive units may dispose of displacement sensors, by way of which a deduction pertaining to the orientation of the levers 40, 90 may be made. Alternatively or additionally, goniometry which determines the pivot angle of the levers 40, 90 may be performed. Such a measurement may preferably be performed in each case at the pivot point 8. Furthermore, in the event of piston-cylinder units 60, 70 being used, these units may be equipped with pressure transducers, such that a contact between the levers 40, 90 and the roll surface is determinable. Alternatively, in the event that electric motors are used, the current pick-up may be monitored, in order to determine a resistance in the case of contact made by the levers 40, 90.

The connection between the first end region 41 of the first lever 40 and the first end region 51 of the cooling shell 50 is preferably configured so as to be rotatable. The device here preferably comprises a center of rotation 4 which is connected to the lever 40 by way of an arm 45, and is connected to the cooling shell 50 by way of a further arm 44. The arms 44, 45 here are in each case rigidly connected to the cooling shell 50 and the first lever 40. It is furthermore possible for the first piston-cylinder unit 60 to be likewise rigidly connected to the first lever 40 by way of an arm 65, but being pivotably or rotatably, respectively, mounted on a suspension 68. The same applies to the second piston-cylinder unit 70 which is preferably rigidly connected to a first end region 91 of the second lever 90 by way of an arm 75.

As already described above, the lower or the second, respectively, end 59 of the cooling shell 50 may be displaceably connected to the second lever 90. For example, the cooling shell 50 may dispose of a slide block 95 which slides on a slide rail 94 of the second lever 90. In order for the cooling shell 50 not to be inadvertently removed from the second lever 90, the cooling shell 50 and the lever 90 may be interconnected by way of a spring (not depicted). In particular, this applies to the pivoting of the lever 90 away from the roll surface. Of course, the slide block 95 may alternatively be disposed on the lever, and the slide rail 94 on the cooling shell 50. Furthermore, it is possible for the slide block 95 to be guided in a guide which prevents the slide block 95 being lifted off the slide rail 94, for example. A further possibility for displaceably connecting the lever 90 and the cooling shell 50 consists in providing a roller (not depicted), either on the second lever 90 or on the cooling shell 50, which rolls on the cooling shell 50 or on the lever 90. The roller could be guided in a guide which prevents the roller from being lifted off the opposite rolling surface.

The levers 40, 90, on end regions 41, 91 which are opposite the suspension points 8 of the levers 40, 90, display in each case one end 42, 92. On these ends 42, 92, in each case one preferably rotatable roller 43, 93 may preferably be disposed, the rotation axis of the latter lying substantially parallel to the rotation axis A of the roll 2. Alternatively, a slide rail (not depicted) may be disposed on the ends 42, 92 of the levers 40, 90. The levers 40, 90 here may be configured and pivotably disposed in such a manner that, when viewed in the circumferential direction U, on the one hand, they are in contact with the cooling shell 50 above the upper end 51 thereof (first lever 40) and, on the other hand, are in contact with the cooling shell 50 below the lower end 59 thereof (second lever 90). Contact may preferably be established only by way of the surface of the rollers 43, 93 or rails, respectively, disposed on the lever ends 92, 42. In the event that the diameter d of the roll 2 is known, the position of the latter in a plane which is perpendicular to the axial direction A is also known in the case of contact between the lever ends 42, 92 and the roll surface. The position of the suspension points 8 is likewise preferably not modified or only modified in a defined manner. The positions of the drive units 60, 70 or of the suspension points 68, 78 thereof, respectively and the suspension points 8 are defined in relation to one another or fixed, respectively.

Figure 3:
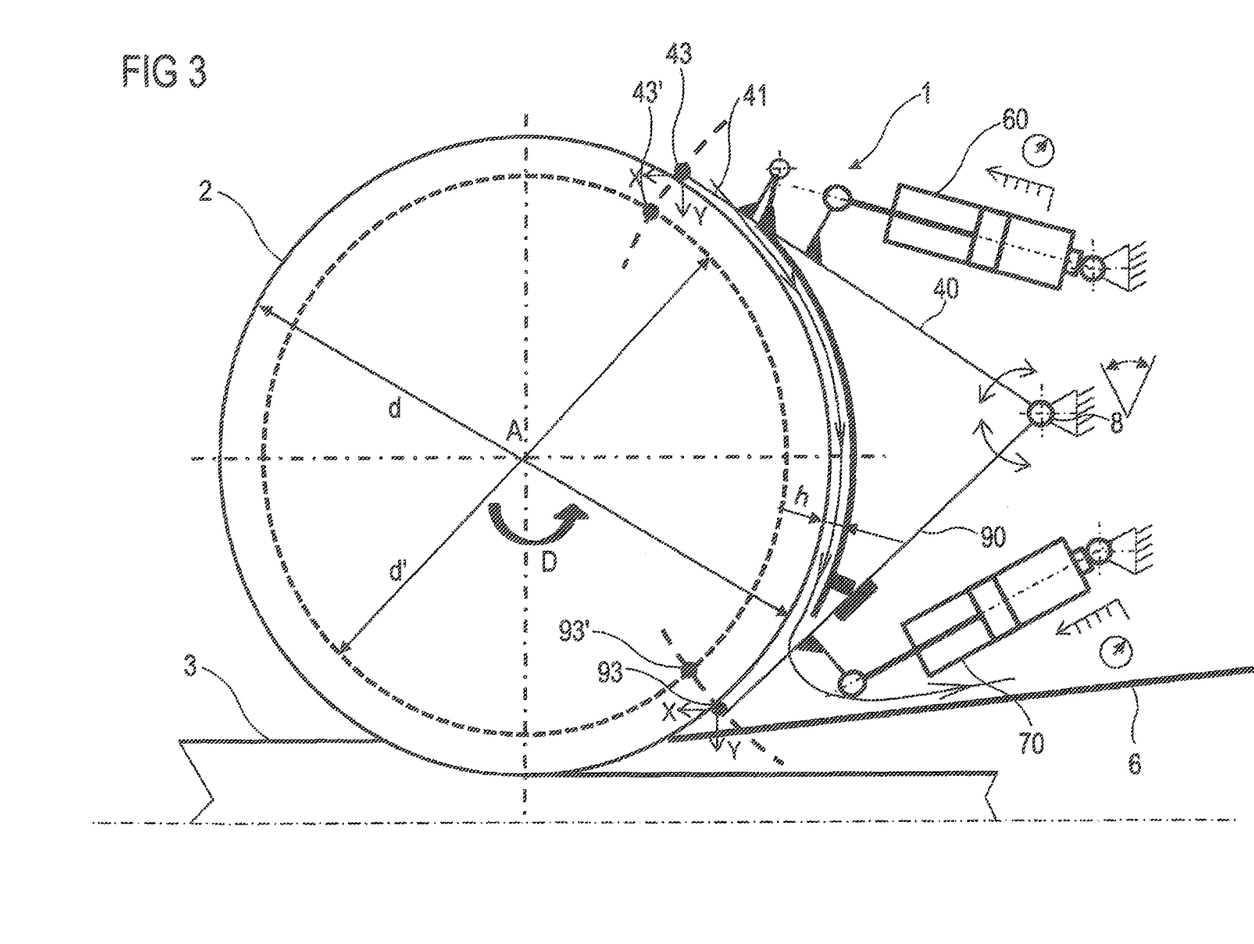
FIG. 3 shows the device illustrated in FIGS. 1 and 2, having further details for placing the ends of the levers of the cooling device against various roll diameters.

FIG. 3, in a schematic manner, shows a placing of the device 1 according to the preceding figures on rolls 2 having various diameters d, d'. In this manner, the roll 2, after stock removal, for example, may display a diameter d' which is smaller in comparison with the diameter d. By pivoting the levers 40, 90, the device 1 can likewise be adapted to this smaller diameter d'. As is illustrated in a dashed manner, the first lever 40 may be pivoted about the suspension point 8 in the direction of the roll surface, until contact is made at point 43' between the roller 43 and the roll 2 having the roll diameter d'. The same applies to the second lever 90 which is pivotable in the direction of the roll surface, until the roller 93 makes contact at point 93' with the surface of the roll 2 having the diameter d'. In the event that the diameter d' and the arrangement of the levers 40, 90, the displacement path of the piston-cylinder units 60, 70 and/or the pivot angle of the levers 40, 90, the geometry of the levers 40, 90 and the cooling shell 50 are known, a deduction pertaining to the position of the roll and preferably likewise to the gap height h between the roll 2 and the cooling shell 50 can be made, since the cooling shell 50 is connected to the levers 40, 90 (in a defined manner).

Figure 4:
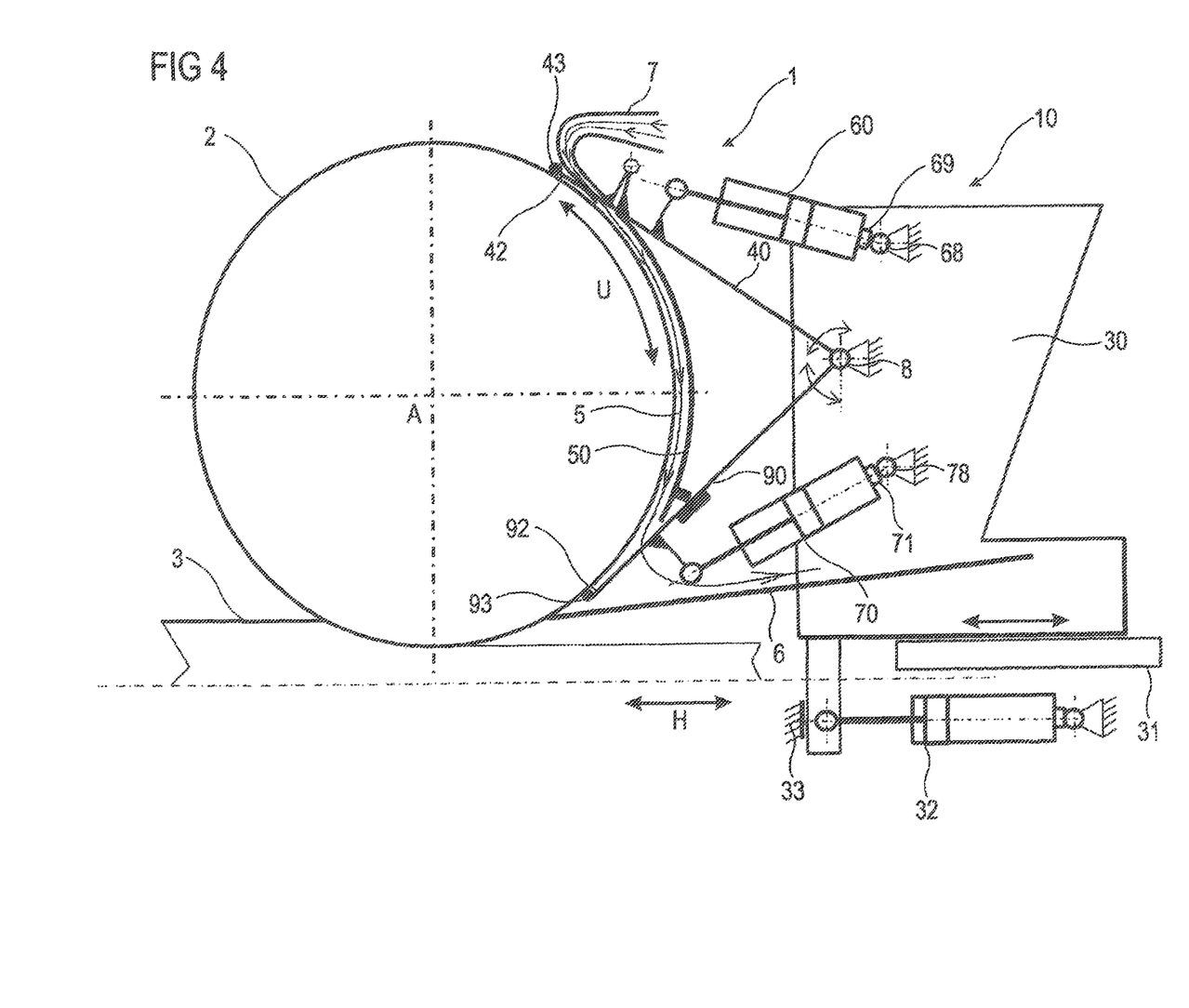
FIG. 4 shows a cooling installation comprising a cooling device according to FIGS. 1 to 3.

FIG. 4 discloses a cooling installation 10 which comprises a cooling device 1 according to FIGS. 1 to 3. The cooling installation 10 comprises a maneuverable support frame 30 on which the suspension points 8 of the levers 40, 90 are located. Furthermore, the drive units are preferably likewise mounted, in particular in a pivotable manner, on suspension points 68, 78 on the support frame 30. The points 68, 78, 8 are preferably locationally fixed in relation to one another. The support frame 30 is preferably configured so as to be horizontally displaceable, such that it is maneuverable in a substantially horizontal direction H, in the direction of the roll 2 to be cooled, or counter to that direction. The support frame 30 may be mounted on a slide rail 31, for example. Alternatively, rollers are also possible, for example. Readjustment may be performed by means of a drive 32, for example by way of a hydraulic or electric drive. Furthermore, the installation 10 may dispose of a stop 33 which prevents a collision between the cooling shell 5 and the roll 2 in the event of maneuvering the support frame 30.

If and when desired, a plurality of the devices 1 or installations 10, respectively, described above may be placed against a roll 2, for example on the infeed and delivery side of a roll 2 or a roll stand, respectively.

Figure 2:
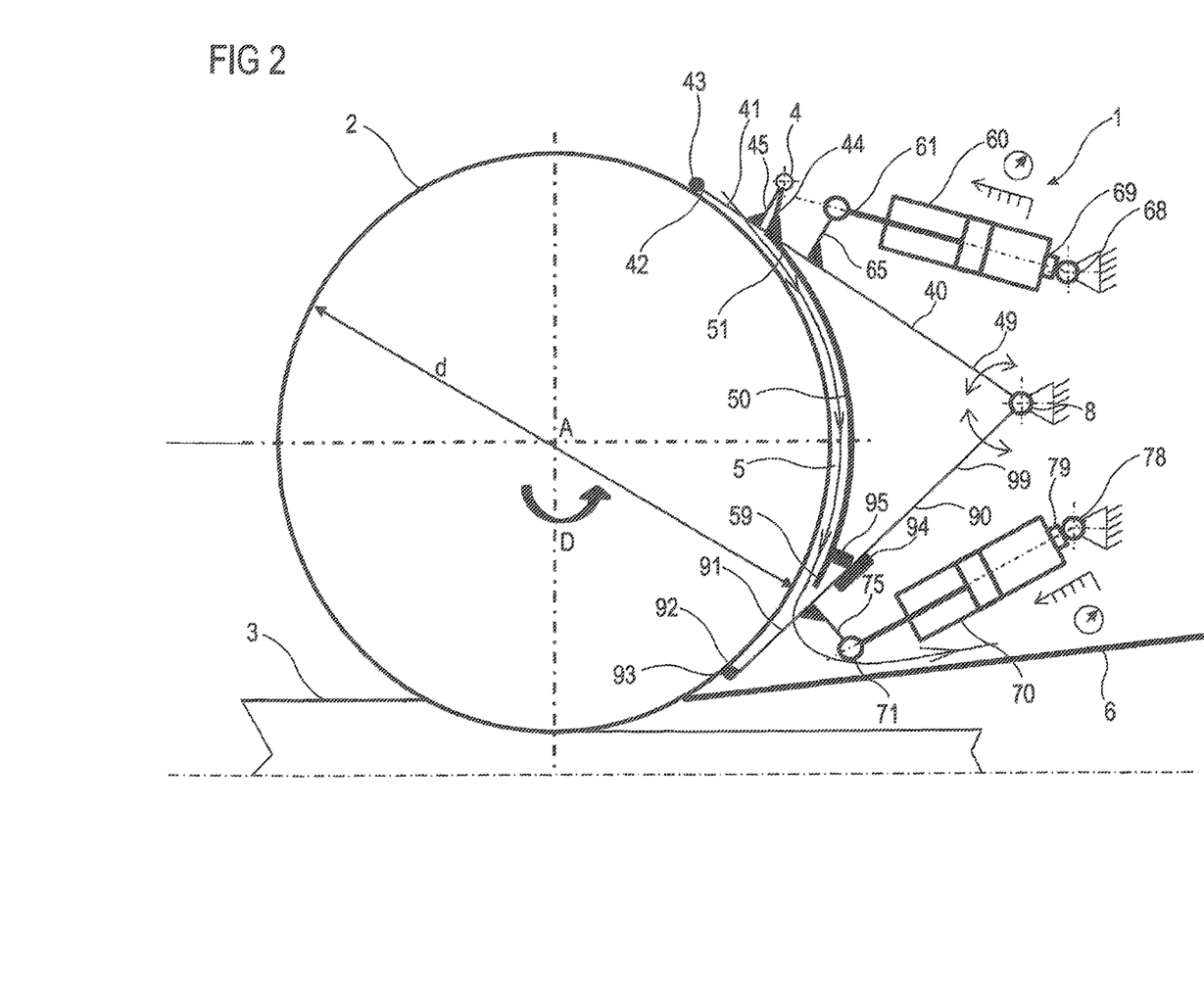
FIG. 2 shows the device illustrated in FIG. 1, having further details.

Furthermore the levers 40, 90 have been described in relation to the arrangement in FIGS. 1 to 3. However, the first lever 40 and the second lever 90 may likewise be swapped, such that the lower lever 90 is rotatably connected to the cooling shell 50 and the upper lever 40 is displaceably connected to the upper end region 51 of the cooling shell 50.

The exemplary embodiments described above serve above all for improving the understanding of the invention and are not to be understood as limiting. The scope of protection of the present patent application is derived from the patent claims.

The features of the exemplary embodiments described may be combined with one another or substituted for one another.

Furthermore, the described features may be adapted to existing circumstances or present requirements by a person skilled in the art.

LIST OF REFERENCE SIGNS

1 Cooling device
2 Roll/worker roll
3 Metal strip/stock to be rolled
4 Center of rotation/rotating joint
5 Cooling gap
6 Wiper
7 Nozzle
8 Suspension point
10 Cooling installation 30 Support frame
31 Slide rail
32 Drive unit
33 Stop
40 First lever
41 First end region of the first lever
42 End of the first lever on the first end region
43 Roller on the end of the first lever
43' Position of the end of the first lever in the case of a second roll diameter
44 Arm for the connection of the first end region of the cooling shell to the center of rotation
45 Arm for the connection of the first end region of the first lever to the center of rotation
49 Second end region of the first lever
50 Cooling shell
51 First end region of the cooling shell when viewed in the circumferential direction of the roll
59 Second end region of the cooling shell when viewed in the circumferential direction of the roll
60 First drive unit/piston-cylinder unit
61 First end of the first piston-cylinder unit
68 Pivot point of the first piston-cylinder unit
69 Second end of the first piston-cylinder unit
70 Second drive unit/piston-cylinder unit
71 First end of the second piston-cylinder unit
78 Pivot point of the second piston-cylinder unit
79 Second end of the second piston-cylinder unit
90 Second lever
91 First end region of the second lever
92 End of the second lever on the first end region
93 Roller on the end of the second lever
93' Position of the end of the second lever in the case of a second roll diameter
94 Slide rail
95 Slide block
99 Second end region of the second lever
A Roller axis
d First roll diameter
d' Second roll diameter
D Direction of rotation of the roll
h Height of the cooling gap/spacing between the cooling shell and the roll surface
H Horizontal direction
U Circumferential direction of the roll/direction which is parallel to the roll surface

The invention claimed is:

1. A device for cooling a roll having a roll surface, comprising:
   a cooling shell that lies opposite at least a sub-region of a circumference of the roll surface to form a cooling gap, through which a cooling medium is flowable, between the sub-region of the roll surface and the cooling shell;
   a first lever pivotable about a first suspension point and pivotable in a direction of the roll surface and, when viewed in a circumferential direction of the roll, rotatably connected to a first end region of the cooling shell; and
   a second lever pivotable about a further suspension point and pivotable in the direction of the roll surface and, when viewed in the circumferential direction of the roll, connected to a second end region of the cooling shell so as to be displaceable in relation thereto, wherein the cooling gap, by pivoting the first and the second levers, is selectively decreasable or increasable.

2. The device according to claim 1, wherein the second end region of the cooling shell is connected to the second lever in a sliding or rolling manner.

3. The device according to claim 1, wherein the second end region of the cooling shell is connected to the second lever so that the second end region is moved on a defined path when the second lever is moved.

4. The device according to claim 1, wherein the suspension points of the levers are disposed opposite a side of the cooling shell that faces away from the roll surface.

5. The device according to claim 1, wherein a pivot axis extending in each case through the suspension points extends so as to be substantially parallel to a roll axis.

6. The device according to claim 5, wherein the two suspension points coincide.

7. The device according to claim 1, further comprising a nozzle for introducing the cooling medium into the gap, the nozzle being configured on one of the end regions of the cooling shell for introducing the cooling medium in a substantially tangential manner into the gap.

8. The device according to claim 7, wherein the cooling medium is introduced counter to a direction of rotation of the roll.

9. The device according to claim 1, further comprising:
   a first drive unit for pivoting the first lever about the first suspension point, and
   a second drive unit for pivoting the second lever about the further suspension point.

10. The device according to claim 9, wherein
    the first lever has a first end region and a second end region, and, when viewed in the circumferential direction of the roll, the first end region is rotatably connected to the first end region of the cooling shell, and the second end region of said first lever is pivotably mountable on the first suspension point; and
    the second lever has a first end region and a second end region, wherein, when viewed in the circumferential direction of the roll, the first end region of said second lever is displaceably connected to the second end region of the cooling shell, and the second end region of said second lever is pivotably mountable on the further suspension point.

11. The device according to claim 10, wherein, for pivoting the first and the second levers, the first and the second drive units are in each case connected to the first end regions of the first and the second levers.

12. The device according to claim 11, wherein the drive units in each case comprise a piston-cylinder unit which, for pivoting the lever, has one end rigidly connected to the first end region of the respective lever, and a second end rotatably mounted.

13. The device according to claim 12, wherein the piston-cylinder units in each case are connected to the first end region of the respective lever by a rigid arm.

14. The device according to claim 10, wherein the first end region of the first lever has an end for contacting the roll surface, and the first end region of the second lever has an end for contacting the roll surface.

15. The device according to claim 14, wherein the ends in each case comprise one rotatable roller for contacting the roll surface.

16. The device according to claim 14, wherein the device is configured so that, when viewed in the circumferential direction of the roll, the end of the first lever contacts the roll surface ahead of the first end region of the cooling shell, and, when viewed in the circumferential direction of the roll, the end of the second lever contacts the roll surface behind the second end region of the cooling shell.

17. The device according to claim 14, wherein, upon contact of the two ends of the first and the second levers with the roll surface, the sub-region of the roll surface lying between the ends of the first and the second levers, and the first lever and the second lever substantially defines a triangle in a plane which is perpendicular to the roll axis, wherein the roll surface forms a curved side of the triangle, and the first and the second levers form two sides of the triangle.

18. The device according to claim 14, wherein the first end of the first lever is connected to the first end region of the cooling shell by way of a center of rotation; the device further comprising a first arm rigidly connected to the first lever, and a second arm rigidly connected to the first end region of the cooling shell; wherein the center of rotation is connected to the first lever by the first arm, and the cooling shell is connected to the center of rotation by the second arm, and the center of rotation is movable in a plane perpendicular to the axial direction of the roll.

19. The device according to claim 14, wherein the first and the second levers are in each case disposed so as to be pivotable about their respective suspension point so that, by pivoting the end which lies at the first end region, the first and the second levers are in each case capable of being brought into contact with the roll surface and of being lifted thereof again.

20. The device according to claim 14, wherein the second end region of the cooling shell is connected to the first end region of the second lever by at least one elastic element or a guide rail.

21. The device according to claim 14, further comprising an evaluation system for determining a height of the cooling gap, which upon contact between the ends of the first and the second levers and the roll surface, and based on a known geometry and/or arrangement of the first and the second levers, the cooling shell, the rotatable connection between the first lever and positioning of the suspension points, and a diameter of the roll, is configured for calculating a position of the roll.

22. The device according to claim 14, wherein the first and the second levers, when viewed in a plane which is perpendicular to an axial direction of the roll, extend in each case in a rod-shaped manner toward the end at the first end region, or substantially extend in a plate-shaped manner in a plane parallel to the axial direction of the roll.

23. A cooling installation, comprising: the device according to claim 9; and a support frame that is maneuverable in a substantially horizontal manner and independently of a position of the roll and by way of which the drive units and/or the first and the second levers are supported on the suspension points.

24. The cooling device according to claim 1, further comprising a wiper for wiping off cooling medium exiting from the cooling gap on an end of the cooling shell, wherein the wiper extends in a plate-shaped manner away from the surface of the roll so as to divert a flow of coolant exiting from the cooling gap away from the roll.

25. A method for cooling a work roll having a work surface using the device according to claim 1, comprising the steps of:
providing the work roll;
determining a diameter of the work roll;
fitting the work roll in a roll stand;
bringing the cooling device close to the roll surface using a maneuverable support frame;
contacting the roll surface by way of the first and the second levers by pivoting the first and the second levers in the direction of the roll surface;
calculating a position and/or a diameter of the work roll;
lifting the first and the second levers by pivoting the first and the second levers away from the roll surface;
adjusting the spacing of the cooling shell from the roll surface by pivoting the first and the second levers;
introducing cooling medium into the cooling gap;
commencing a rolling operation by the work roll;
stopping the rolling operation;
increasing the cooling gap, by pivoting the first and the second levers and/or by maneuvering the device by means of the support frame; and
dismounting the work roll from the roll stand.

* * * * *